(12) United States Patent
Li et al.

(10) Patent No.: US 12,543,134 B2
(45) Date of Patent: Feb. 3, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 222 days.

(21) Appl. No.: 18/076,664

(22) Filed: Dec. 7, 2022

(65) Prior Publication Data

US 2023/0095158 A1 Mar. 30, 2023

Related U.S. Application Data

(63) Continuation of application No. PCT/CN2020/098249, filed on Jun. 24, 2020.

(51) Int. Cl.
*H04W 56/00* (2009.01)
*H04W 74/00* (2009.01)
*H04W 74/08* (2009.01)
*H04W 74/0833* (2024.01)

(52) U.S. Cl.
CPC ..... *H04W 56/005* (2013.01); *H04W 74/0841* (2013.01); *H04W 74/0866* (2013.01)

(58) Field of Classification Search
CPC ........... H04W 56/005; H04W 74/0841; H04W 74/0866

USPC .......................................................... 370/503
See application file for complete search history.

(56) References Cited

U.S. PATENT DOCUMENTS

| 10,455,603 | B2 | 10/2019 | Hosseini | |
|---|---|---|---|---|
| 10,820,320 | B2 | 10/2020 | Wang | |
| 10,849,146 | B2 | 11/2020 | Yang | |
| 2014/0329520 | A1* | 11/2014 | Militano | ............... G01S 5/0258 455/422.1 |
| 2018/0139747 | A1 | 5/2018 | Hosseini | |
| 2018/0160440 | A1 | 6/2018 | Hosseini | |
| 2019/0174447 | A1* | 6/2019 | Liu | ....................... H04W 76/28 |
| 2019/0191449 | A1 | 6/2019 | Yang et al. | |
| 2019/0246428 | A1* | 8/2019 | Yoon | ..................... H04W 16/14 |

(Continued)

FOREIGN PATENT DOCUMENTS

| CN | 101154984 A | 4/2008 |
|---|---|---|
| CN | 109842932 A | 6/2019 |

(Continued)

OTHER PUBLICATIONS

Huawei et al, "Discussion on timing advance and RACH procedures for NTN", 3GPP TSG RAN WG1 Meeting #96bis R1-1904000, Xi'an, China, Apr. 8-12, 2019.

(Continued)

*Primary Examiner* — Faisal Choudhury
(74) *Attorney, Agent, or Firm* — BAYES PLLC

(57) ABSTRACT

A wireless communication method, a terminal device and a network device are provided. In the wireless communication method, the terminal device transmits a first timing advance (TA) value of the terminal device to a network device in response to that the terminal device satisfies a preset condition.

16 Claims, 6 Drawing Sheets

(56) References Cited

U.S. PATENT DOCUMENTS

| | | | |
|---|---|---|---|
| 2019/0254052 A1* | 8/2019 | Liu | H04W 72/23 |
| 2020/0029326 A1 | 1/2020 | Wang et al. | |
| 2020/0177254 A1 | 6/2020 | Lee | |
| 2021/0289463 A1* | 9/2021 | Bi | H04W 74/0833 |
| 2021/0391909 A1 | 12/2021 | Lee | |
| 2022/0078739 A1* | 3/2022 | Zhang | H04W 56/0045 |
| 2022/0150858 A1* | 5/2022 | Ren | H04L 27/2607 |
| 2022/0167297 A1* | 5/2022 | Wang | H04W 56/00 |
| 2022/0264636 A1* | 8/2022 | Wang | H04B 7/18513 |
| 2022/0361251 A1* | 11/2022 | Yu | H04B 7/18513 |

FOREIGN PATENT DOCUMENTS

| | | | |
|---|---|---|---|
| CN | 109863793 A | 6/2019 | |
| CN | 110475336 A | 11/2019 | |
| CN | 110838898 A | 2/2020 | |
| EP | 4147499 A1 | 3/2023 | |
| WO | 2018032508 A1 | 2/2018 | |
| WO | WO-2018205428 A1 * | 11/2018 | H04W 72/08 |
| WO | WO-2020001277 A1 * | 1/2020 | H04W 56/0005 |
| WO | 2021230815 A1 | 11/2021 | |

OTHER PUBLICATIONS

International Search Report in the international application No. PCT/CN2020/098249, mailed on Mar. 11, 2021.

Written Opinion of the International Searching Authority in the international application No. PCT/CN2020/098249, mailed on Mar. 11, 2021.

"3rd Generation Partnership Project; Technical Specification Group Radio Access Network; Solutions for NR to support non-terrestrial networks (NTN) (Release 16)", 3GPP TR 38.821 V1.0.0 (Dec. 2019).

Extended European Search Report in the European application No. 20941592.6, mailed on Jun. 1, 2023, 10 pages.

First Office Action of the Chinese application No. 202310354372.3, issued on Jul. 24, 2025.

Second Office Action of the Chinese application No. 202310354372.3, issued on Dec. 5, 2025.

* cited by examiner

WIRELESS COMMUNICATION METHOD, TERMINAL DEVICE AND NETWORK DEVICE

CROSS-REFERENCE TO RELATED APPLICATION

This is a continuation of International Patent Application No. PCT/CN2020/098249 filed on Jun. 24, 2020, the disclosure of which is hereby incorporated by reference in its entirety.

BACKGROUND

An important feature of uplink transmission is the orthogonal multiple access of different terminal devices in time and frequency, that is, the uplink transmission from different terminal devices in the same cell does not interfere with each other. In order to ensure the orthogonality of uplink transmission and avoid intra-cell interference, the network device requires that signals from different terminal devices at the same time but in different frequency domain resources arrive at the network device at basically aligned times. In order to ensure the time synchronization at the network device side, new radio (NR) and non-terrestrial network (NTN) systems support timing advance (TA) mechanism.

In NTN system, in order to avoid frequent TA adjustment instructions from the network device, the terminal devices with positioning ability can calculate TA through location information and ephemeris information, so as to achieve the purpose of uplink synchronization. In addition to maintaining uplink synchronization, the network device also needs to obtain TA values calculated by the terminal devices to determine how to schedule uplink transmission. However, when the terminal devices frequently report TA values to the network device, it will cause excessive network overhead.

SUMMARY

Embodiments of the present disclosure relate to the communication field, and in particular to a wireless communication method, a terminal device and a network device.

In the embodiments of the present disclosure, there is provided a wireless communication method, a terminal device and a network device, thereby reducing the network overhead.

According to a first aspect of the disclosure, there is provided a wireless communication method, including that: a terminal device transmits a first timing advance (TA) value of the terminal device to a network device in response to that the terminal device satisfies a preset condition.

According to a second aspect of the disclosure, there is provided a wireless communication method, including that: a network device receives a first timing advance (TA) value of a terminal device, the first TA value being transmitted in response to that the terminal device satisfies a preset condition.

According to a third aspect of the disclosure, there is provided a terminal device, configured to implement the method in the above first aspect or any implementations thereof.

Specifically, the terminal device includes functional modules for implementing the method in the above first aspect or any implementations thereof.

According to a fourth aspect of the disclosure, there is provided a network device, configured to implement the method in the above second aspect or any implementations thereof.

Specifically, the network device includes functional modules for implementing the method in the above second aspect or any implementations thereof.

According to a fifth aspect of the disclosure, there is provided a terminal device, including a processor and a memory. The memory is configured to store a computer program, and the processor is configured to call and execute the computer program stored in the memory to implement the above method of the first aspect or any implementations thereof.

According to a sixth aspect of the disclosure, there is provided a network device, including a processor and a memory. The memory is configured to store a computer program, and the processor is configured to call and execute the computer program stored in the memory to implement the above method of the second aspect or any implementations thereof.

According to a seventh aspect of the disclosure, there is provided an apparatus, configured to implement a method in any of the first aspect to second aspect or any implementations thereof.

Specifically, the apparatus includes a processor, which configured to call and execute a computer program in a memory to cause a device equipped with the apparatus to implement the method in any of the first aspect to second aspect or any implementations thereof.

According to an eighth aspect of the disclosure, there is provided a computer-readable storage medium, configured to store a computer program that causes a computer to implement the method in any of the first aspect to second aspect or any implementations thereof.

According to a ninth aspect of the disclosure, there is provided a computer program product, including computer program instructions that cause a computer to implement the method in any of the first aspect to second aspect or any implementations thereof.

According to a tenth aspect of the disclosure, there is provided a computer program that, when executed on a computer, causes a computer to implement the method in any of the first aspect to second aspect or any implementations thereof.

According to the technical solution, the terminal device transmits a first TA value of the terminal device to a network device in response to that the terminal device satisfies a preset condition. That is to say, the terminal device does not report the TA value to the network device in any case, but only reports the TA value when the preset condition is satisfied, thereby reducing the network overhead.

DETAILED DESCRIPTION

Figure 1A:
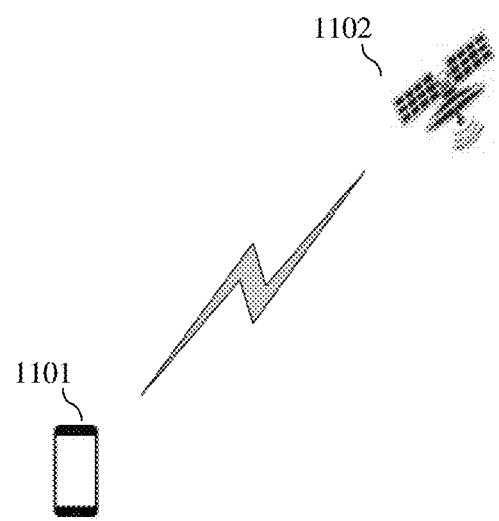
FIG. 1A is a schematic diagram of a communication system architecture provided by an embodiment of the present disclosure.

The technical solution of the embodiments of the present disclosure will be described below in conjunction with the drawings in the embodiments of the present disclosure, and it will be obvious that the described embodiments are part of the embodiments of the present disclosure, but not all of them. Based on the embodiments in the present disclosure, all other embodiments obtained by those skilled in the art without making creative efforts fall within the scope of protection of the present disclosure.

The technical solution of the embodiments of the disclosure can be applied to various communication systems. For example, global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, non-terrestrial networks (NTN) system, universal mobile telecommunication system (UMTS), wireless local area network (WLAN), wireless fidelity (WiFi), 5th-generation communication system or other communication systems.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, vehicle to everything (V2X) communication, etc. Embodiments of the present disclosure can also be applied to these communication systems.

Optionally, the communication system in the embodiments of the present disclosure can be applied to a carrier aggregation (CA) scenario, a dual connectivity (DC) scenario, and a standalone (SA) network distribution scenario.

Optionally, the embodiments of the present disclosure may be applied to unlicensed spectrum or licensed spectrum. The unlicensed spectrum can also be considered as shared spectrum, and the licensed spectrum can also be considered as non-shared spectrum.

Optionally, the embodiments of the present disclosure may be applied to a non-terrestrial networks (NTN) system or to a terrestrial networks (TN) system.

Embodiments of the present disclosure are described in connection with a network device and a terminal device. The terminal device may be referred to as user equipment (UE), an access terminal, a subscriber unit, a subscriber station, a mobile station, a mobile platform, a remote station, a remote terminal, a mobile device, a user terminal, a terminal, a wireless communication device, a user agent, or a user device. The terminal device may be a station (ST) in the WLAN, or it may be a cellular phone, a cordless phone, a session initiation protocol (SIP) telephone, wireless local loop (WLL) station, a personal digital assistant (PDA) device, a handheld device with wireless communication function, a computing device or other processing device connected to wireless modem, an in-vehicle device, a wearable device, a next-generation communication system such as a terminal device in an NR network, or the terminal device in the future evolved public land mobile network (PLMN) network, etc.

In embodiments of the present disclosure, the terminal device can be deployed on land, including indoor or outdoor, hand-held, wearable or in-vehicle. The terminal device can also be deployed on the water (such as ships, etc.). The terminal device can also be deployed on airplanes, balloons and satellites, etc.

In the embodiments of the present disclosure, the terminal device can be a mobile phone, a pad, a computer with wireless transceiver function, a virtual reality (VR) terminal device, an augmented reality (AR) terminal device, a wireless terminal device in industrial control, in-vehicle terminal device, a wireless terminal device in self driving, a wireless terminal device in remote medical, a wireless terminal device in smart grid, a wireless terminal device in transportation safety, a wireless terminal device in smart city or smart home, wearable terminal device, etc. The terminal device according to the embodiment of the present disclosure may also be referred to as a terminal, user equipment (UE), an access terminal device, an in-vehicle terminal, an industrial control terminal, a UE unit, a UE station, a mobile station, a mobile platform, a remote station, a remote terminal device, a mobile device, a UE terminal device, a wireless communication device, a UE agent or a UE device, etc. The terminal device can also be fixed or mobile.

By way of example and not limitation, in embodiments of the present disclosure, the terminal device may also be a wearable device. A wearable device can also be called wearable intelligent device, which is the general name of wearable devices developed by applying wearable technology to intelligently design daily wear, such as glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. Generalized wearable smart devices include full functions and large size, which can realize complete or partial functions without relying on smart phones, such as smart watches or smart glasses, and only focus on certain application functions, and the wearable smart devices need to be used in conjunction with other devices such as smart phones, such as various smart bracelets and smart jewelry for monitoring physical signs.

The network device may be a device for communicating with a mobile device. The network device can be an access point (AP) in WLAN, a base transceiver station (BTS) in GSM or CDMA, a NodeB (NB) in WCDMA, an evolutional node B (eNB or eNodeB) in LTE, a relay station or an access point, or an in-vehicle device, a wearable device, a gNB in NR network or a network device in future evolved PLMN network, etc.

The network device may have mobility characteristics, for example, the network device may be a mobile device. Optionally, the network device can be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Optionally, the network device can also be a base station arranged on land, water and the like.

In the embodiments of the present disclosure, the network device may provide services for a cell, the terminal device communicates with the network device through transmission resources (e.g. frequency domain resources, or spectrum resources) used by the cell, the cell may be a cell corresponding to a network device (e.g. a base station), the cell may belong to a macro base station or a base station corresponding to a small cell. The small cell can include metro cell, micro cell, pico cell, femto cell, etc. These small cells have the characteristics of small coverage and low transmission power, and are suitable for providing high-speed data transmission services.

The architecture of the communication system in the present disclosure will be described below with reference to FIG. 1A and FIG. 1B.

FIG. 1A is a schematic diagram of a communication system architecture provided by an embodiment of the present disclosure. Referring to FIG. 1A, a terminal device 1101 and a satellite 1102 are included, and wireless communication may be performed between the terminal device 1101 and the satellite 1102. The network formed between the terminal device 1101 and the satellite 1102 may also be referred to as an NTN. In the communication system architecture illustrated in FIG. 1A, the satellite 1102 may have the function of a base station and there may be direct communication between the terminal device 1101 and the satellite 1102. Under the system architecture, the satellite 1102 can be called a network device. Optionally, the communication system may include multiple network devices 1102 and other numbers of terminal devices may be included within the coverage of each network device 1102, which is not limited by embodiments of the present disclosure.

Figure 1B:
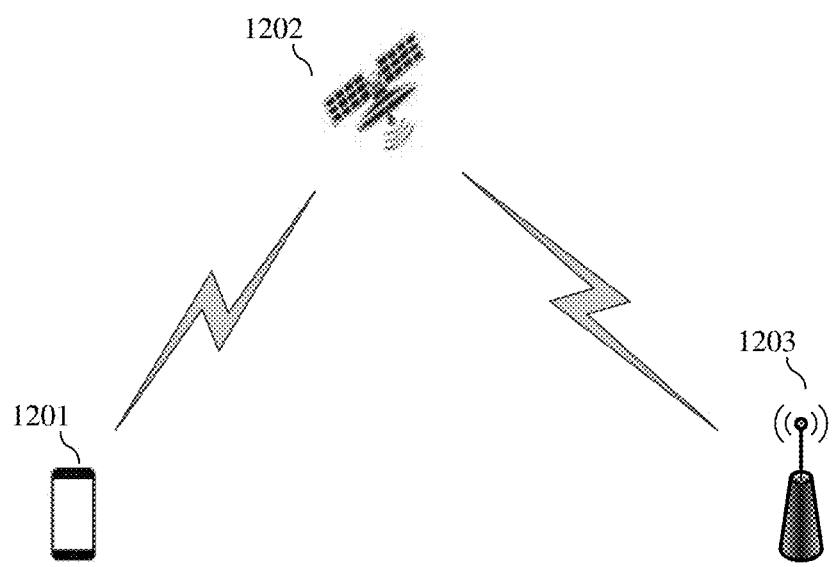
FIG. 1B is a schematic diagram of another communication system architecture provided by an embodiment of the present disclosure.

FIG. 1B is a schematic diagram of another communication system architecture provided by an embodiment of the present disclosure. Referring to FIG. 1B, a terminal device 1201, a satellite 1202 and a base station 1203 are included, wireless communication may be performed between the terminal device 1201 and the satellite 1202, and communication may be performed between the satellite 1202 and the base station 1203. The network formed among the terminal device 1201, the satellite 1202 and the base station 1203 may also be referred to as an NTN. In the communication system architecture illustrated in FIG. 1B, the satellite 1202 may not have the function of a base station, and communication between the terminal device 1201 and the base station 1203 requires a relay through the satellite 1202. Under the system architecture, the base station 1203 can be called a network device. Optionally, the communication system may include multiple network devices 1203 and other numbers of terminal devices may be included within the coverage of each network device 1203, which is not limited by embodiments of the present disclosure.

It should be noted that FIG. 1A and FIG. 1B are only illustrative of the system to which the present disclosure applies, and of course, the method illustrated in the embodiments of the present disclosure can also be applied to other systems, such as a 5G communication system, an LTE communication system, etc. The embodiments of the present disclosure are not specifically limited thereto.

Optionally, the wireless communication system illustrated in FIG. 1A and FIG. 1B may also include other network entities such as a mobility management entity (MME), an access and mobility management function (AMF), etc. Embodiments of the present disclosure are not limited thereto.

It should be understood that the terms "system" and "network" in the present disclosure are often used interchangeably herein. In the present disclosure, the term "and/or" is used to describe an association relationship of associated objects, and for example indicates that there can be three relationships between related objects. For example, A and/or B may mean that the following three situations: Only A exists, both A and B exist, and only B exists. The character "/" in the present disclosure generally indicates an "or" relationship between the associated objects.

It should be understood that the reference to "indicate" in embodiments of the present disclosure may be a direct indication, may be an indirect indication, or may indicate an association relationship. For example, A indicating B can mean that A directly indicates B, for example, B can be obtained through A. It can also mean that A indirectly indicates B, for example, A indicates C, and B can be obtained by C. It can also indicate that there is an association relationship between A and B.

In the description of embodiments of the present disclosure, the term "correspond" may mean that there is a direct correspondence or an indirect correspondence relationship between the two, may also mean that there is an association relationship between the two, or may also be a relationship between indicating and being indicated, configuring and being configured, etc.

Optionally, the indication information in embodiments of the present disclosure includes physical layer signaling such as at least one of downlink control information (DCI), radio resource control (RRC) signaling or media access control (MAC) control element (CE).

Optionally, the high layer parameters in embodiments of the present disclosure include at least one of RRC signaling or MAC CE.

In order to clearly explain the idea of the embodiments of the present disclosure, the related technical contents of the embodiments of the present disclosure are briefly described first. Embodiments of the present disclosure include at least some of the following.

TA Mechanism in NR System:

An important feature of uplink transmission is the orthogonal multiple access of different terminal devices in time and frequency, that is, the uplink transmission from different terminal devices in the same cell does not interfere with each other. In order to ensure the orthogonality of uplink transmission and avoid intra-cell interference, the network device requires that signals from different terminal devices at the same time but in different frequency domain resources arrive at the network device at basically aligned times. In order to ensure the time synchronization at the network device side, NR supports uplink TA mechanism.

Figure 2:
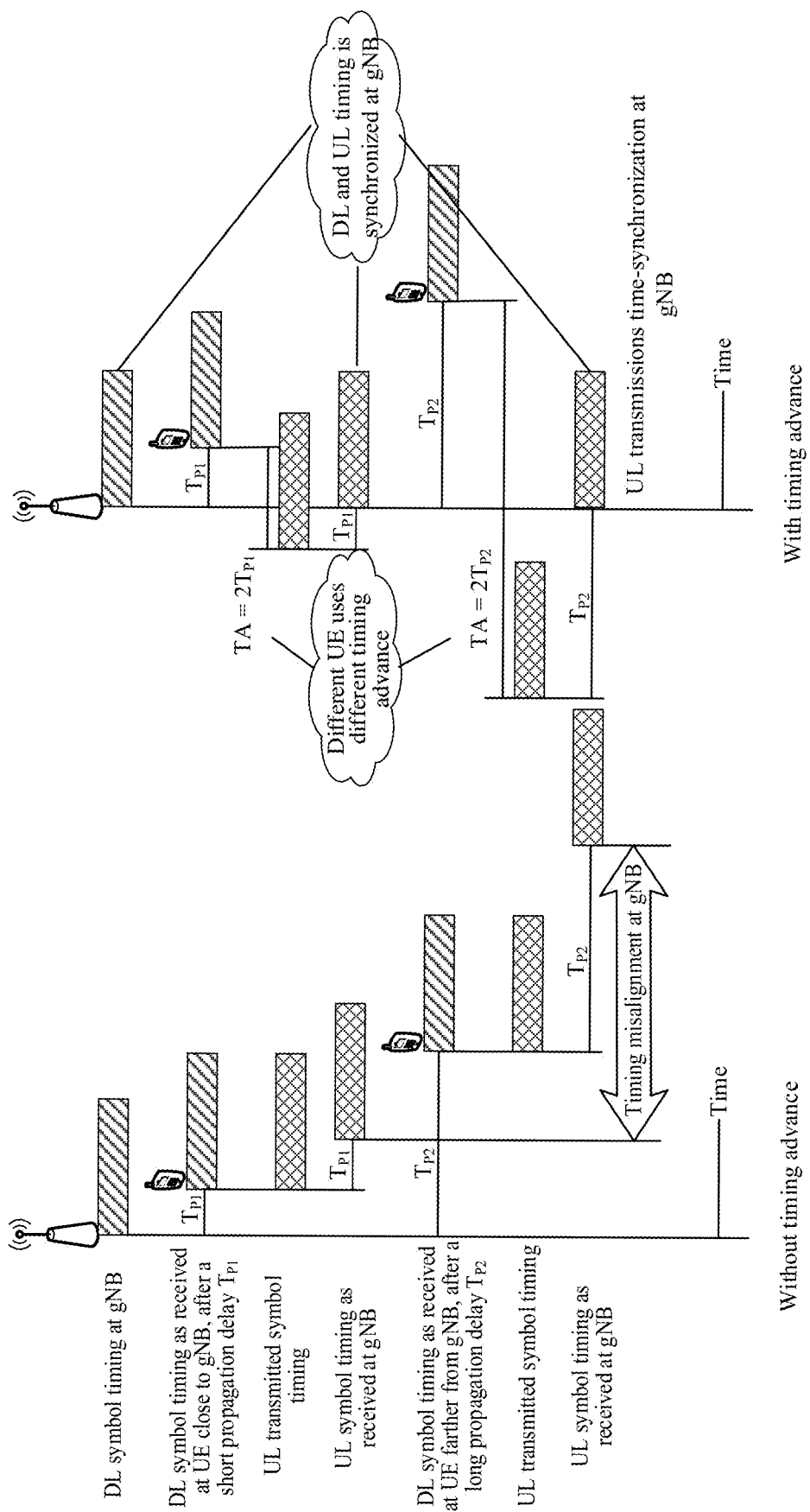
FIG. 2 is a schematic diagram of time synchronization on the network device side provided by an embodiment of the present disclosure.

FIG. 2 is a schematic diagram of time synchronization on the network device side provided by an embodiment of the present disclosure. As illustrated in the left drawing in FIG.

2, the uplink clock and the downlink clock on the network device side are the same, and the uplink clock and the downlink clock on the UE side are also the same. When the TA mechanism is not adopted, the arrival time of uplink data from different UEs arriving at the network device side is misaligned. As illustrated in the right drawing of FIG. 2, the uplink clock and the downlink clock on the network device side are the same, while there is an offset between the uplink clock and the downlink clock on the UE side, and different UEs have different uplink TA values, that is, a TA mechanism is introduced. By appropriately controlling the TA value corresponding to each UE, the network device can control the arrival time of uplink data from different UEs arriving at the network device, so that the arrival time of uplink data from different UEs arriving at the network device side is time-synchronized. Specifically, the UE far away from the network device must send uplink data ahead of the UE close to the network device due to the large transmission delay.

The network device determines the TA value of each terminal device based on measuring the uplink transmission of the terminal device. The network device sends TA commands to the terminal device in two ways.

Acquisition of initial TA: In the random access process, the network device determines the TA value by measuring the received preamble(s), and sends it to the terminal device through the timing advance command field of random access response (RAR).

Adjustment of TA in RRC connection state: Although the terminal device and network device have achieved uplink synchronization during random access process, the timing of uplink signals arriving at the network device may change with time, so the terminal device needs to constantly update the uplink TA value to keep uplink synchronized. If the TA value of a certain terminal device needs to be corrected, the network device will send a timing advance command to the terminal device, asking it to adjust the TA value. The timing advance command is sent to the terminal device through MAC CE of the timing advance command.

Based on the TA mechanism described above, the timing relationship in the NR system may include one or more of the following situations:

Transmission timing of physical uplink shared channel (PUSCH) scheduled by DCI: When terminal device is scheduled by DCI to send PUSCH, indication information of $K_2$ is included in the DCI, where $K_2$ is used to determine time slot for transmitting the PUSCH. For example, if the scheduling DCI is received on time slot n, a time slot allocated for PUSCH transmission is time slot $$\left\lfloor n \cdot \frac{2^{\mu_{PUSCH}}}{2^{\mu_{PDCCH}}} \right\rfloor + K_2,$$

where $K_2$ is determined according to the sub-carrier interval of the physical downlink shared channel (PDSCH), $\mu_{PUSCH}$ and $\mu_{PDCCH}$ are used to determine the sub-carrier interval configured for PUSCH and physical downlink control channel (PDCCH), respectively. The value of $K_2$ ranges from 0 to 32.

Transmission timing of PUSCH scheduled by RAR grant: For a time slot scheduled by RAR grant for PUSCH transmission, if the end position of PDSCH including the corresponding RAR grant message received by the terminal device is in time slot n after the terminal device initiates physical random access channel (PRACH) transmission, then the terminal device transmits the PUSCH on the time slot n+$K_2$+Δ, where $K_2$ and Δ are agreed by a protocol.

Transmission timing of transmitting hybrid automatic repeat request-acknowledgement (HARQ-ACK) on physical uplink control channel (PUCCH): For a time slot of PUCCH transmission, if the end position of one PDSCH reception is in time slot n or the end position of one PDCCH reception indicating semi-persistent scheduling (SPS) PDSCH release is in time slot n, the terminal device shall transmit the corresponding HARQ-ACK information on the PUCCH resources within the time slot n+$K_1$, where $K_1$ is the number of time slots and is indicated by the PDSCH-to-HARQ-timing-indicator information field in the DCI format or provided by the dl-DataToUL-ACK parameter. $K_1$=0 indicates that the last time slot of the PUCCH transmission overlaps the time slot of PDSCH reception or PDCCH reception indicating SPS PDSCH release.

Transmission timing of channel state information (CSI) on PUSCH: The transmission timing of CSI on PUSCH is the same as that of PUSCH transmission scheduled by DCI in general.

CSI reference resource timing: CSI reference resource of CSI reported on uplink time slot n' is determined according to a single downlink time slot n−$n_{CSI\_ref}$, where $$n = \left\lfloor n' \cdot \frac{2^{\mu_{DL}}}{2^{\mu_{UL}}} \right\rfloor,$$

$\mu_{DL}$ and $\mu_{UL}$ are sub-carrier interval configurations for downlink and uplink, respectively. The value of $n_{CSI\_ref}$ depends on the type of CSI reported.

Transmission timing of aperiodic sounding reference signal (SRS): If the terminal device receives DCI to trigger transmission of the aperiodic SRS on time slot n, the terminal device transmits an aperiodic SRS in each set of triggered SRS resources on a time slot $$\left\lfloor n \cdot \frac{2^{\mu_{SRS}}}{2^{\mu_{PDCCH}}} \right\rfloor + k,$$

where k is configured by a high layer parameter slotOffset in each set of triggered SRS resources and determined according to a sub-carrier interval corresponding to the triggered SRS transmission, $\mu_{SRS}$ and $\mu_{PDCCH}$ are sub-carrier interval configurations for the triggered SRS transmission and the PDCCH carrying the trigger command, respectively.

The above TA mechanism is used in NTN system. As mentioned above, in NTN system, in order to avoid frequent TA adjustment instructions from network device, terminal devices with positioning ability can calculate TA through location information and ephemeris information, so as to achieve the purpose of uplink synchronization. In addition to maintaining uplink synchronization, the network device also needs to obtain the TA values calculated by the terminal devices to determine how to schedule uplink transmission. For example, when scheduling PUSCH through DCI, the $K_2$ indicated by DCI needs to be greater than the TA value reported by the terminal device, so as to ensure the availability of uplink scheduling resources. However, when the terminal devices frequently report TA values to the network device, it will cause excessive network overhead.

In order to solve the above technical problem, the disclosure adopts a manner of reporting the TA value when the terminal device satisfies certain conditions.

The technical solution of the present disclosure will be described in detail by specific embodiments below.

Figure 3:
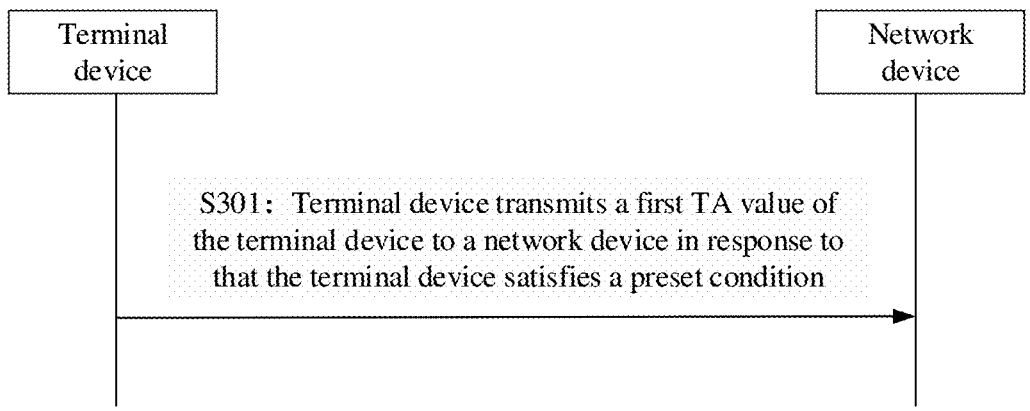
FIG. 3 is a schematic flow diagram of a wireless communication method 300 according to an embodiment of the present disclosure.

FIG. 3 is a schematic flow diagram of a wireless communication method 300 according to an embodiment of the present disclosure. The method 300 may be applied to a communication system as illustrated in FIG. 1A or FIG. 1B. Specifically, as illustrated in FIG. 3, the method 300 may include the following operation S301.

At S301, a terminal device transmits a first timing advance (TA) value of the terminal device to a network device in response to that the terminal device satisfies a preset condition.

Optionally, the first TA value is a current TA value determined by the terminal device based on current location information, ephemeris information of the terminal device, and the like.

Optionally, the first TA value is an absolute TA value or a relative TA value of the terminal device.

The absolute TA value of the terminal device refers to a timing advance amount of the uplink transmission currently determined by the terminal device relative to the downlink scheduling, and the downlink scheduling is used for scheduling the uplink transmission, such as a timing advance amount of a PUSCH currently determined by the terminal device relative to a PDCCH carrying DCI when the PUSCH is scheduled by the DCI.

The relative TA value is a TA change of the absolute TA value relative to a last TA value obtained by the terminal device.

Optionally, the last TA value obtained is a TA value obtained by the terminal device from the network device during a random access process. For example, in the random access process, the network device determines the TA value by measuring the received preamble(s), and sends it to the terminal device through a timing advance command field of RAR.

Or, the last TA value obtained is a TA value reported by the terminal device to the network device after the random access process. That is, the last TA value obtained is the TA value determined by the terminal device according to the last location information, ephemeris information and the like.

Optionally, the random access process is triggered by a first event. The first event is any one of the following:
the terminal device enters a radio resource control connected (RRC_CONNECTED) state from a radio resource control idle (RRC_IDLE) state. That is, the wireless connection is established during initial access of the terminal device.
the terminal device enters an RRC connection reconstruction process.
under the RRC_CONNECTED state of the terminal device, downlink (DL) data arrives and uplink (UL) data is in an out-of-sync state.
under the RRC_CONNECTED state of the terminal device, UL data arrives and DL data is in the out-of-sync state.
the terminal device has received an RRC connection reconfiguration message. For example, the terminal device establishes, modifies or releases the radio bearer (RB), and performs handover, prepares, modifies or releases the measurements, etc.
the terminal device enters the RRC_CONNECTED state from a radio resource control inactive (RRC_INACTIVE) state.
the terminal device establishes time calibration during addition of secondary cell (SCell).

Optionally, the preset condition includes at least one of the following: a TA change of the first TA value relative to a last TA value obtained by the terminal device is greater than a preset threshold; or a time domain parameter value indicated by the network device to the terminal device is unavailable, the time domain parameter value being used to determine a transmission time of an uplink channel or uplink transmission information of the terminal device.

Optionally, the preset condition includes at least one of the following: a TA change of the first TA value relative to a last TA value obtained by the terminal device is greater than or equal to a preset threshold; or a time domain parameter value indicated by the network device to the terminal device is unavailable, the time domain parameter value being used to determine a transmission time of an uplink channel or uplink transmission information of the terminal device.

Optionally, the time domain parameter value is a parameter value $K_2$ used to determine a transmission time of a physical uplink shared channel (PUSCH) when the PUSCH is scheduled through downlink control information (DCI).

In this case, the time domain parameter value $K_2$ being unavailable refers to that a transmission time of the PUSCH scheduled through a PDCCH is earlier than a receiving time of the PDCCH.

Optionally, the time domain parameter value is a parameter value $K_2$ used to determine a transmission time of a PUSCH when the PUSCH is scheduled through a random access response (RAR) grant.

In this case, the time domain parameter value $K_2$ being unavailable refers to that a transmission time of the PUSCH scheduled through a RAR grant is earlier than a receiving time of the RAR grant.

Optionally, the time domain parameter value is a parameter value $K_1$ used to determine a transmission time of an HARQ-ACK transmitted on a PUCCH.

In this case, the time domain parameter value $K_1$ being unavailable refers to that a transmission time of an HARQ-ACK is earlier than a receiving time of a PDSCH detected by the HARQ-ACK, or the transmission time of an HARQ-ACK is earlier than a receiving time of a PDCCH released by an SPS PDSCH detected by the HARQ-ACK.

Optionally, the time domain parameter value is a parameter value used to determine a transmission time of channel state information (CSI) when the CSI on a PUSCH is scheduled through DCI.

In this case, the time domain parameter value being unavailable refers to that a transmission time of the CSI scheduled through a PDCCH is earlier than a receiving time of the PDCCH.

Optionally, the time domain parameter value is a parameter value $n_{CSI\_ref}$ used to determine a transmission time of a CSI reference resource.

In this case, the time domain parameter value being unavailable refers to that a transmission time of a CSI reference resource is earlier than a single downlink time slot used to determine the CSI reference resource.

Optionally, the time domain parameter value is a parameter value k used to determine a transmission time of an aperiodic sounding reference signal (SRS) when the aperiodic SRS is scheduled through DCI.

In this case, the time domain parameter value k being unavailable refers to that a transmission time of the SRS scheduled through DCI is earlier than a receiving time of the DCI.

It should be noted that the time domain parameter value can be absolute time domain parameter values or relative time domain parameter values. For example, in the TA mechanism of NR system, the above time domain parameter values are all absolute time domain parameter values. According to the TA mechanism, the time domain parameter values need to be greater than TA values of the terminal device, and the TA values are absolute TA values. But in NTN scenario, due to the long communication distance between the terminal device and the satellite (or the network device), the propagation delay of signal communication is very large, and the propagation delay can range from tens of milliseconds to hundreds of milliseconds, which is specifically related to the height of satellite orbit and the service type of satellite communication. In order to deal with relatively large propagation delay, the TA value of the terminal device is much larger than that of the terminal device in the NR system, so the time domain parameter values are also much larger, and the time domain parameter values are sent to the terminal device by the network device. If the time domain parameter value is too large, it will inevitably lead to too many coding bits, thereby causing extra signaling overhead. Therefore, in some solutions, an offset is introduced, which is known to both the terminal device and the network device, and the time domain parameter values indicated by the network device are relative time domain parameter values relative to the offset, for example, $K_2$ and k indicated by the network device through PDCCH are relative time domain parameter values, so that additional signaling overhead can be reduced.

Optionally, the preset threshold in the preset condition is carried in configuration information configured by the network device for the terminal device.

It should be noted that a preset threshold corresponding to a first TA value when the first TA value is an absolute TA value and a preset threshold corresponding to a first TA value when the first TA value is a relative TA value may be the same or different.

The preset threshold corresponding to the first TA value refers to that a TA change of the first TA value relative to a last TA value obtained by the terminal device is greater than the preset threshold in preset thresholds.

It should be noted that there is no restriction on how to determine the preset threshold in the present disclosure.

The above configuration information also carries resource configuration information for reporting the first TA value. Based on this, the terminal device can report the first TA value on the corresponding resource according to the resource configuration information. Specifically, it can include the following two optional manners:

First optional manner: The first TA value is carried in an MAC CE on a first PUSCH.

The terminal device is configured with at least one UL carrier bandwidth part (BWP), and for at least one of the at least one UL BWP, a first PUSCH is configured.

Optionally, the first PUSCH is any of the following: a dynamically scheduled PUSCH, a configured grant-physical uplink shared channel (CG-PUSCH), or a semi-persistent scheduling (SPS) PUSCH.

Second optional manner: The first TA value is carried in a first PUCCH.

The terminal device is configured with at least one UL BWP, and for at least one of the at least one UL BWP, a PUCCH resource is configured. The configured PUCCH resource includes the first PUCCH.

Optionally, the first PUCCH is a periodic PUCCH or an aperiodic PUCCH.

It should be noted that the first TA value can also be carried in other uplink channels except PUCCH and PUSCH, such as other uplink shared channels (UL-SCH), which is not limited in the present disclosure. Based on this, the configuration information configured by the network device for the terminal device includes resource information of other uplink channels.

To sum up, in the present disclosure, there is provided a wireless communication method, including that: a terminal device transmits a first TA value of the terminal device to a network device in response to that the terminal device satisfies a preset condition. The preset condition includes at least one of the following: a TA change of the first TA value relative to a last TA value obtained by the terminal device is greater than a preset threshold; or a time domain parameter value indicated by the network device to the terminal device is unavailable. That is to say, the terminal device does not report the TA value to the network device under any cases, but only reports the TA value when the preset condition is satisfied, thereby reducing the network overhead.

As described above, in some solutions, an offset is introduced, which is known to both the terminal device and the network device, and the time domain parameter values indicated by the network device are relative time domain parameter values relative to the offset, for example, $K_2$ and k indicated by the network device through PDCCH are relative time domain parameter values, so that additional signaling overhead can be reduced. Accordingly, in the present disclosure, there is also provided a method of determining an offset, which is specifically illustrated by the following embodiments.

Optionally, the terminal device determines an offset corresponding to the time domain parameter value according to the last TA value obtained and the preset threshold. In this case, the time domain parameter value is a relative time domain parameter value, and a sum of the offset and the relative time domain parameter value is an absolute time domain parameter value corresponding to the time domain parameter value.

It should be noted that the final time domain parameter value used by the terminal device is the absolute time domain parameter value.

Optionally, the terminal device determines that a sum of the last TA value obtained and the preset threshold is the offset corresponding to the time domain parameter value. Assuming that the offset is represented by offset, the last TA value obtained is represented by TA, and the preset threshold is represented by TA-delta, then offset=TA+TA-delta.

It should be noted that the terminal device can also determine that a sum of the last TA value obtained, the preset threshold, and a fixed parameter value such as a is the offset corresponding to the time domain parameter value.

Correspondingly, for the network device, the offset corresponding to the time domain parameter value can also be determined by the above method. Therefore, the method for determining the offset corresponding to the time domain parameter value by the network device can refer to the method for determining the offset corresponding to the time domain parameter value by the terminal device, which is not described here.

In the present disclosure, the terminal device or the network device can determine the offset corresponding to the time domain parameter value according to the last TA value obtained and the preset threshold, so that the offset is close to the first TA value (i.e., the current TA value), but the time domain parameter value needs to be greater than the first TA value of the terminal device. In some solutions, the time domain parameter value indicated by the network device is a relative time domain parameter value relative to the offset. Therefore, when the offset is closer to the first TA value, the relative time domain parameter value is smaller, and the required coding bits are too few, thereby reducing the network signaling overhead.

As described above, the preset condition includes at least one of the following: a TA change of the first TA value relative to a last TA value obtained by the terminal device is greater than a preset threshold; or a time domain parameter value indicated by the network device to the terminal device is unavailable, the time domain parameter value being used to determine a transmission time of an uplink channel or uplink transmission information of the terminal device. Or, the preset condition includes at least one of the following: a TA change of the first TA value relative to a last TA value obtained by the terminal device is greater than or equal to a preset threshold; or a time domain parameter value indicated by the network device to the terminal device is unavailable, the time domain parameter value being used to determine a transmission time of an uplink channel or uplink transmission information of the terminal device. The following is examples for the two cases in which the preset condition is that the TA change of the first TA value relative to the last TA value obtained by the terminal device is equal to the preset threshold and the time domain parameter value indicated by the network device to the terminal device is unavailable.

Figure 4:
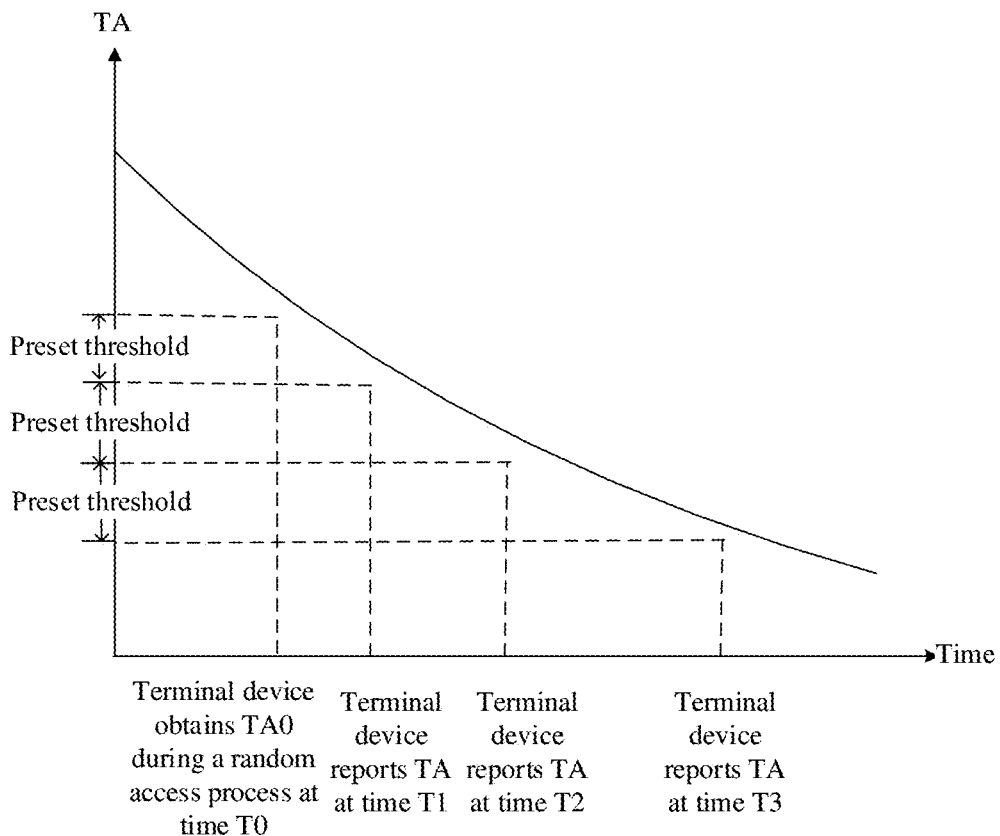
FIG. 4 is a schematic diagram of reporting TA values provided by an embodiment of the present disclosure.

First example: FIG. 4 is a schematic diagram of reporting TA values provided by an embodiment of the present disclosure. As illustrated in FIG. 4, at time T0, the terminal device obtains a TA value indicated by the network device during the random access process, which is denoted by TA0. At time T1, the terminal device calculates the TA value through position information and ephemeris information, which is denoted by TA1, and calculates the difference between the TA1 and TA0 to obtain a current TA change. Since the TA change is equal to a preset threshold, the terminal device triggers the TA report at time T1. At time T2, the terminal device calculates the TA value through position information and ephemeris information, which is denoted by TA2, and calculates the difference between the TA2 and TA0 to obtain the current TA change. Since the TA change is equal to a preset threshold, the terminal device triggers the TA report at time T2. At time T3, the terminal device calculates a TA value through position information and ephemeris information, which is denoted by TA3, and calculates the difference between the TA3 and TA0 to obtain the current TA change. Since the TA change is equal to a preset threshold, the terminal device triggers a TA report at time T3.

Figure 5:
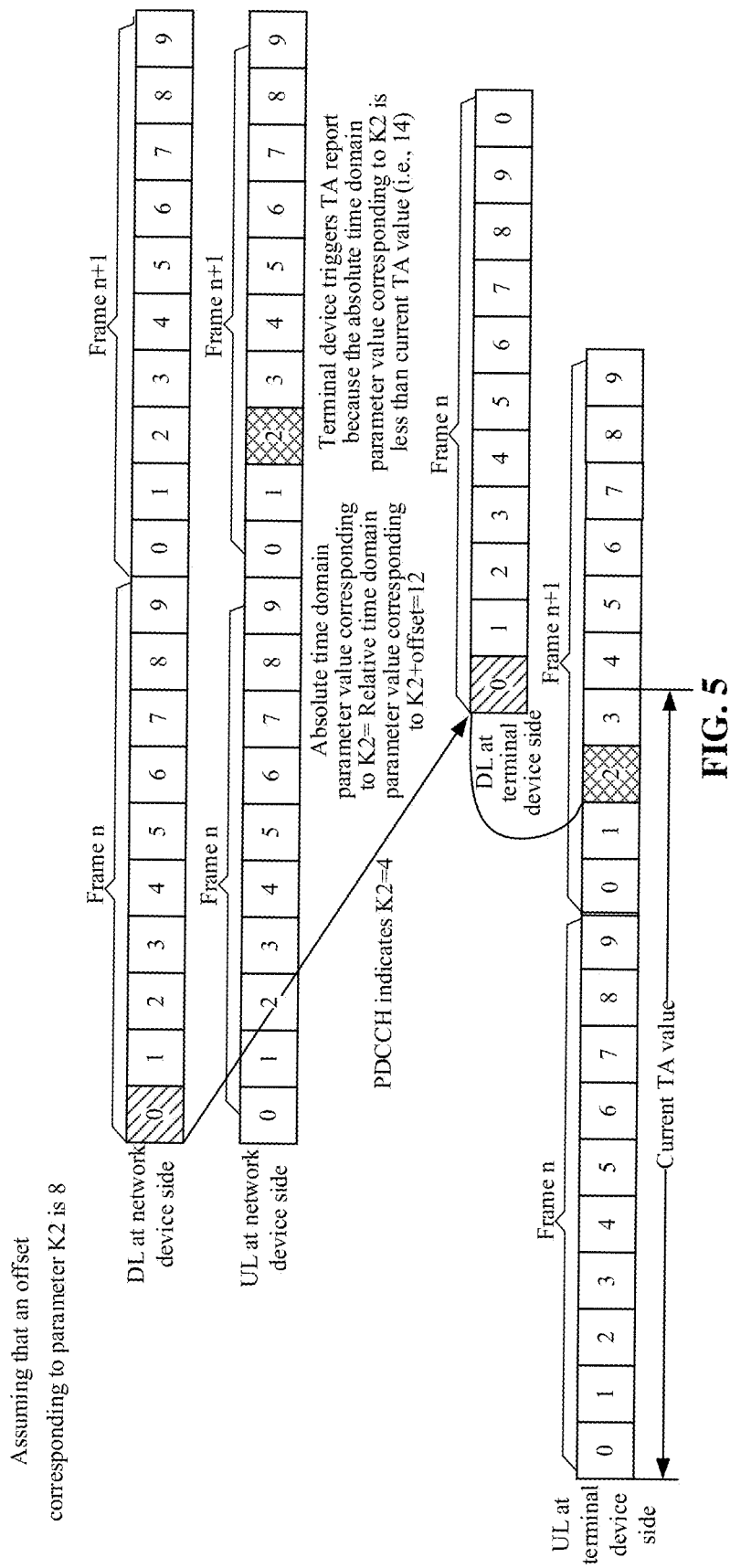
FIG. 5 is a schematic diagram of reporting TA values provided by another embodiment of the present disclosure.

Second example: FIG. 5 is a schematic diagram of reporting TA values provided by another embodiment of the present disclosure. As illustrated in FIG. 5, when the network device schedules PUSCH through DCI in PDCCH, the network device indicates K2=4 in subframe 0 of frame n in DL, that is, the relative time domain parameter value is 4, and assuming that the offset corresponding to the K2 parameter is 8, the absolute time domain parameter value corresponding to K2 is 4+8=12. Assuming the current TA value=14, K2 is unavailable because the absolute time domain parameter value 12 corresponding to K2 is less than the current TA value 14, and at this time the terminal device triggers report of the TA value.

The method embodiments of the present disclosure have been described in detail above with reference to FIG. 3 to FIG. 5, and the apparatus embodiments of the present disclosure have been described in detail below with reference to FIG. 6 to FIG. 10. It should be understood that the apparatus embodiments and the method embodiments correspond to each other, and similar descriptions may refer to the method embodiments.

Figure 6:
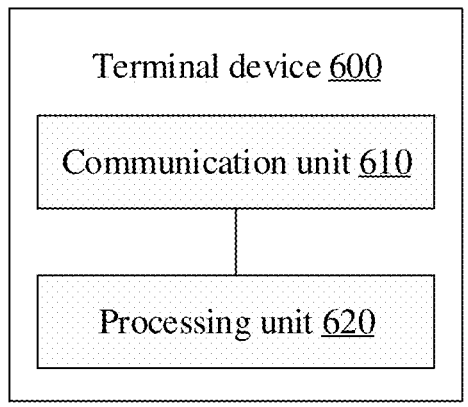
FIG. 6 illustrates a schematic block diagram of a terminal device 600 according to an embodiment of the present disclosure.

FIG. 6 illustrates a schematic block diagram of a terminal device 600 according to an embodiment of the present disclosure. As illustrated in FIG. 6, the terminal device 600 includes a communication unit 610.

The communication unit 610 is configured to transmit a first timing advance (TA) value of the terminal device to a network device in response to that the terminal device satisfies a preset condition.

Optionally, the preset condition includes at least one of the following: a TA change of the first TA value relative to a last TA value obtained by the terminal device is greater than a preset threshold; or a time domain parameter value indicated by the network device to the terminal device is unavailable, the time domain parameter value being used to determine a transmission time of an uplink channel or uplink transmission information of the terminal device.

Optionally, the time domain parameter value is a parameter value $K_2$ used to determine a transmission time of a physical uplink shared channel (PUSCH) when the PUSCH is scheduled through downlink control information (DCI); or the time domain parameter value is a parameter value $K_2$ used to determine a transmission time of the PUSCH when the PUSCH is scheduled through a random access response (RAR) grant; or the time domain parameter value is a parameter value $K_1$ used to determine a transmission time of a hybrid automatic repeat request-acknowledgement (HARQ-ACK) transmitted on a physical uplink control channel (PUCCH); or the time domain parameter value is a parameter value used to determine a transmission time of channel state information (CSI) when the CSI on the PUSCH is scheduled through DCI; or the time domain parameter value is a parameter value $n_{CSI\_ref}$ used to determine a transmission time of a CSI reference resource; or the time domain parameter value is a parameter value k used to determine a transmission time of an aperiodic sounding reference signal (SRS) when the aperiodic SRS is scheduled through DCI.

Optionally, the terminal device 600 further includes a processing unit 620. The processing unit 620 is configured to determine an offset corresponding to the time domain parameter value according to the last TA value obtained and the preset threshold. The time domain parameter value is a relative time domain parameter value, and a sum of the offset and the relative time domain parameter value is an absolute time domain parameter value corresponding to the time domain parameter value.

Optionally, the processing unit 620 is specifically configured to: determine that a sum of the last TA value obtained and the preset threshold is the offset corresponding to the time domain parameter value.

Optionally, the preset condition includes at least one of the following: a TA change of the first TA value relative to a last TA value obtained by the terminal device is greater than a preset threshold; or a transmission time of the PUSCH scheduled through a physical downlink control channel (PDCCH) is earlier than a receiving time of the PDCCH.

Optionally, the preset condition includes at least one of the following: a TA change of the first TA value relative to a last TA value obtained by the terminal device is greater than a preset threshold; or a transmission time of the PUSCH scheduled through an RAR grant is earlier than a receiving time of the RAR grant.

Optionally, the preset condition includes at least one of the following: a TA change of the first TA value relative to a last TA value obtained by the terminal device is greater than a preset threshold; or a transmission time of an HARQ-ACK is earlier than a receiving time of a physical downlink shared channel (PDSCH) detected by the HARQ-ACK, or the transmission time of an HARQ-ACK is earlier than a receiving time of a PDCCH released by a semi-persistent scheduling (SPS) PDSCH detected by the HARQ-ACK.

Optionally, the preset condition includes at least one of the following: a TA change of the first TA value relative to a last TA value obtained by the terminal device is greater than a preset threshold; or a transmission time of CSI scheduled through a PDCCH is earlier than a receiving time of the PDCCH.

Optionally, the preset condition includes at least one of the following: a TA change of the first TA value relative to a last TA value obtained by the terminal device is greater than a preset threshold; or a transmission time of a CSI reference resource is earlier than a single downlink time slot used to determine the CSI reference resource.

Optionally, the preset condition includes at least one of the following: a TA change of the first TA value relative to a last TA value obtained by the terminal device is greater than a preset threshold; or a transmission time of an SRS scheduled through DCI is earlier than a receiving time of the DCI.

Optionally, the last TA value obtained is a TA value obtained by the terminal device from the network device during a random access process, or the last TA value obtained is a TA value reported by the terminal device to the network device after the random access process.

Optionally, the random access process is triggered by a first event. The first event is any one of the following:
the terminal device enters a radio resource control connected (RRC_CONNECTED) state from a radio resource control idle (RRC_IDLE) state;
the terminal device enters an RRC connection reconstruction process;
under the RRC_CONNECTED state of the terminal device, downlink (DL) data arrives and uplink (UL) data is in an out-of-sync state;
under the RRC_CONNECTED state of the terminal device, UL data arrives and DL data is in the out-of-sync state;
the terminal device has received an RRC connection reconfiguration message;
the terminal device enters the RRC_CONNECTED state from a radio resource control inactive (RRC_INACTIVE) state;
the terminal device establishes time calibration during addition of secondary cell (SCell).

Optionally, the preset threshold is carried in configuration information.

Optionally, the configuration information further carries resource configuration information for uploading the first TA value.

Optionally, the first TA value is carried in a medium access control (MAC) control element (CE) on a first PUSCH.

Optionally, the first PUSCH is any of the following: a dynamically scheduled PUSCH, a configured grant-physical uplink shared channel (CG-PUSCH), or a semi-persistent scheduling (SPS) PUSCH.

Optionally, the terminal device is configured with at least one UL carrier bandwidth part (BWP), and for at least one of the at least one UL BWP, the first PUSCH is configured.

Optionally, the first TA value is carried on a first PUCCH.

Optionally, the first PUCCH is a periodic PUCCH or an aperiodic PUCCH.

Optionally, the terminal device is configured with at least one UL BWP, and for at least one of the at least one UL BWP, a PUCCH resource is configured. The configured PUCCH resource includes the first PUCCH.

Optionally, the first TA value is an absolute TA value or a relative TA value of the terminal device.

Optionally, the relative TA value is a TA change of the absolute TA value relative to a last TA value obtained by the terminal device.

Optionally, in some embodiments, the communication unit may be a communication interface or a transceiver, or may be an input-output interface of a communication chip or a system-on-chip. The processing unit may be one or more processors.

It should be understood that the terminal device 600 according to the embodiments of the present disclosure may correspond to the terminal device in the method embodiments of the present disclosure, and the above and other operations and/or functions of various units in the terminal device 600 are designed to implement the respective flow of the terminal device in the method 300 illustrated in FIG. 3, respectively, which will not be repeated here for the sake of brevity.

Figure 7:
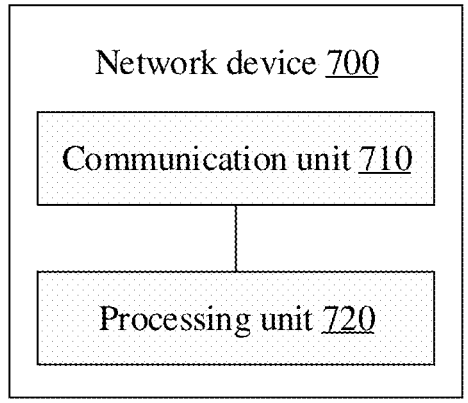
FIG. 7 illustrates a schematic block diagram of a network device 700 according to an embodiment of the present disclosure.

FIG. 7 illustrates a schematic block diagram of a network device 700 according to an embodiment of the present disclosure. As illustrated in FIG. 7, the network device 700 includes a communication unit 710. The communication unit 710 is configured to receive a first TA value of a terminal device. The first TA value is transmitted in response to that the terminal device satisfies a preset condition.

Optionally, the preset condition includes at least one of the following: a TA change of the first TA value relative to a last TA value obtained by the terminal device is greater than a preset threshold; or a time domain parameter value indicated by the network device to the terminal device is unavailable, the time domain parameter value being used to determine a transmission time of an uplink channel or uplink transmission information of the terminal device.

Optionally, the time domain parameter value is a parameter value $K_2$ used to determine a transmission time of a physical uplink shared channel (PUSCH) when the PUSCH is scheduled through downlink control information (DCI); or the time domain parameter value is a parameter value $K_2$ used to determine a transmission time of a PUSCH when the PUSCH is scheduled through a random access response (RAR) grant; or the time domain parameter value is a parameter value $K_1$ used to determine a transmission time of a hybrid automatic repeat request-acknowledgement (HARQ-ACK) transmitted on a physical uplink control channel (PUCCH); or the time domain parameter value is a parameter value used to determine a transmission time of channel state information (CSI) when the CSI on the PUSCH is scheduled through DCI; or the time domain parameter value is a parameter value $n_{CSI\_ref}$ used to determine a transmission time of a CSI reference resource; or the time domain parameter value is a parameter value k used to determine a transmission time of an aperiodic sounding reference signal (SRS) when the aperiodic SRS is scheduled through the DCI.

Optionally, the network device 700 further includes a processing unit 720. The processing unit 720 is configured to determine an offset corresponding to the time domain parameter value according to the last TA value obtained and the preset threshold. The time domain parameter value is a relative time domain parameter value, and a sum of the offset and the relative time domain parameter value is an absolute time domain parameter value corresponding to the time domain parameter value.

Optionally, the processing unit 720 is specifically configured to: determine that a sum of the last TA value obtained and the preset threshold is the offset corresponding to the time domain parameter value.

Optionally, the preset condition includes at least one of the following: a TA change of the first TA value relative to a last TA value obtained by the terminal device is greater than a preset threshold; or a transmission time of a PUSCH scheduled through a physical downlink control channel (PDCCH) is earlier than a receiving time of the PDCCH.

Optionally, the preset condition includes at least one of the following: a TA change of the first TA value relative to a last TA value obtained by the terminal device is greater than a preset threshold; or a transmission time of a PUSCH scheduled through an RAR grant is earlier than a receiving time of the RAR grant.

Optionally, the preset condition includes at least one of the following: a TA change of the first TA value relative to a last TA value obtained by the terminal device is greater than a preset threshold; or a transmission time of an HARQ-ACK is earlier than a receiving time of a physical downlink shared channel (PDSCH) detected by the HARQ-ACK, or the transmission time of an HARQ-ACK is earlier than a receiving time of a PDCCH released by a semi-persistent scheduling (SPS) PDSCH detected by the HARQ-ACK.

Optionally, the preset condition includes at least one of the following: a TA change of the first TA value relative to a last TA value obtained by the terminal device is greater than a preset threshold; or a transmission time of CSI scheduled through a PDCCH is earlier than a receiving time of the PDCCH.

Optionally, the preset condition includes at least one of the following: a TA change of the first TA value relative to a last TA value obtained by the terminal device is greater than a preset threshold; or a transmission time of a CSI reference resource is earlier than a single downlink time slot used to determine the CSI reference resource.

Optionally, the preset condition includes at least one of the following: a TA change of the first TA value relative to a last TA value obtained by the terminal device is greater than a preset threshold; or a transmission time of an SRS scheduled through DCI is earlier than a receiving time of the DCI.

Optionally, the last TA value obtained is a TA value obtained by the terminal device from the network device during a random access process, or the last TA value obtained is the TA value reported by the terminal device to the network device after the random access process.

Optionally, the random access process is triggered by a first event. The first event is any one of the following:

the terminal device enters a radio resource control connected (RRC_CONNECTED) state from a radio resource control idle (RRC_IDLE) state;

the terminal device enters an RRC connection reconstruction process.

under the RRC_CONNECTED state of the terminal device, downlink (DL) data arrives and uplink (UL) data is in an out-of-sync state;

under the RRC_CONNECTED state of the terminal device, UL data arrives and DL data is in the out-of-sync state;

the terminal device has received an RRC connection reconfiguration message;

the terminal device enters the RRC_CONNECTED state from a radio resource control inactive (RRC_INACTIVE) state;

the terminal device establishes time calibration during addition of secondary cell (SCell).

Optionally, the preset threshold is carried in configuration information.

Optionally, the configuration information further carries resource configuration information for uploading the first TA value.

Optionally, the first TA value is carried in a medium access control (MAC) control element (CE) on a first PUSCH.

Optionally, the first PUSCH is any of the following: a dynamically scheduled PUSCH, a configured grant-physical uplink shared channel (CG-PUSCH), or a semi-persistent scheduling (SPS) PUSCH.

Optionally, the terminal device is configured with at least one UL carrier bandwidth part (BWP), and for at least one of the at least one UL BWP, the first PUSCH is configured.

Optionally, the first TA value is carried on a first PUCCH.

Optionally, the first PUCCH is a periodic PUCCH or an aperiodic PUCCH.

Optionally, the terminal device is configured with at least one UL BWP, and for at least one of the at least one UL BWP, a PUCCH resource is configured. The configured PUCCH resource includes the first PUCCH.

Optionally, the first TA value is an absolute TA value or a relative TA value of the terminal device.

Optionally, the relative TA value is a TA change of the absolute TA value relative to a last TA value obtained by the terminal device.

Optionally, in some embodiments, the communication unit may be a communication interface or a transceiver, or an input-output interface of a communication chip or a system-on-chip.

It should be understood that the network device 700 according to the embodiment of the present disclosure may correspond to the network device in the method embodiment of the present disclosure, and the above and other operations and/or functions of various units in the network device 700 are designed to implement the respective flow of the network device in the method 300 illustrated in FIG. 3 respectively, which will not be repeated here for the sake of brevity.

Figure 8:
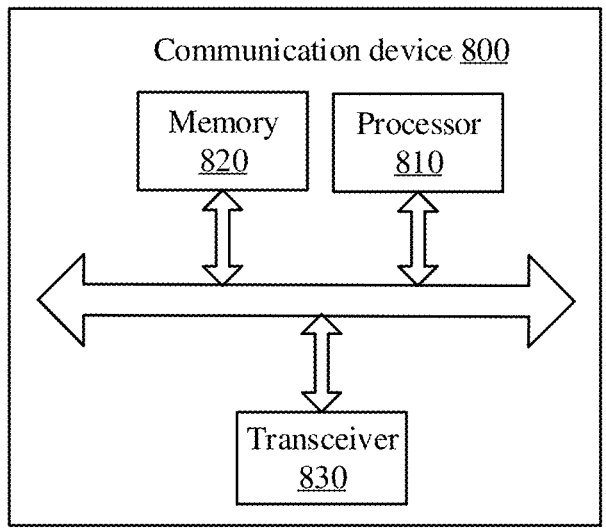
FIG. 8 is a schematic structural diagram of a communication device 400 provided by an embodiment of the present disclosure.

FIG. 8 is a schematic structural diagram of a communication device 800 provided by an embodiment of the present disclosure. A communication device 800 illustrated in FIG. 8 includes a processor 810 that can call and execute a computer program from a memory to implement the method in the embodiments of the present disclosure.

Optionally, as illustrated in FIG. 8, the communication device 800 may also include a memory 820. The processor 810 can call and execute a computer program from memory 820 to implement a method in the embodiments of the present disclosure.

The memory 820 may be a separate device independent of the processor 810 or may be integrated in the processor 810.

Optionally, as illustrated in FIG. 8, the communication device 800 may also include a transceiver 830. The processor 810 may control the transceiver 830 to communicate with other devices, and in particular may send information or data to other devices, or receive information or data sent by other devices.

The transceiver 830 may include a transmitter and a receiver. The transceiver 830 may further include antennas. The number of antennas may be one or more.

Optionally, the communication device 800 may specifically be a network device of the embodiment of the present disclosure, and the communication device 800 may implement corresponding processes implemented by the network device in the respective methods of the embodiments of the present disclosure, which will not be repeated here for the sake of brevity.

Optionally, the communication device 800 may specifically be a terminal device of the embodiment of the present disclosure, and the communication device 800 may implement corresponding processes implemented by the terminal device in the respective methods of the embodiments of the present disclosure, which will not be repeated here for the sake of brevity.

Figure 9:
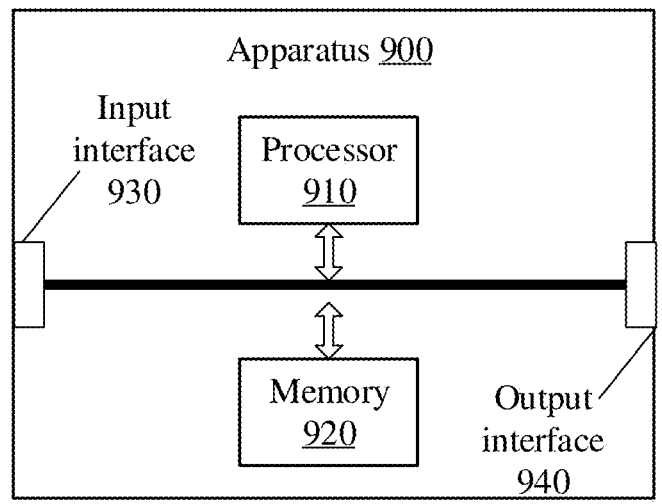
FIG. 9 is a schematic structural diagram of an apparatus according to an embodiment of the present disclosure.

FIG. 9 is a schematic structural diagram of an apparatus according to an embodiment of the present disclosure. An apparatus 900 illustrated in FIG. 9 includes a processor 910 that can call and execute a computer program from a memory to implement the method in the embodiment of the present disclosure.

Optionally, as illustrated in FIG. 9, the apparatus 900 may also include a memory 920. The processor 91 can call and execute a computer program from the memory 920 to implement the method in the embodiment of the present disclosure.

The memory 920 may be a separate device independent of the processor 910 or may be integrated in the processor 910.

Optionally, the apparatus 900 may also include an input interface 930. The processor 910 may control the input interface 930 to communicate with other devices or chips, and in particular may obtain information or data sent by other devices or chips.

Optionally, the apparatus 900 may also include an output interface 940. The processor 910 may control the output interface 940 to communicate with other devices or chips, and in particular may output information or data to other devices or chips.

Optionally, the apparatus may applied to the network device of the embodiment of the present disclosure, and the apparatus may implement corresponding processes implemented by the network device in the respective methods of the embodiments of the present disclosure, which will not be repeated here for the sake of brevity.

Optionally, the apparatus may applied to be the terminal device of the embodiment of the present disclosure, and the apparatus may implement corresponding processes implemented by the terminal device in the respective methods of the embodiments of the present disclosure, which will not be repeated here for the sake of brevity.

Optionally, the apparatus mentioned in the embodiment of the present disclosure may also be a chip, for example may be a system-level chip, a system chip, a chip system or a system-on-chip or the like.

Figure 10:
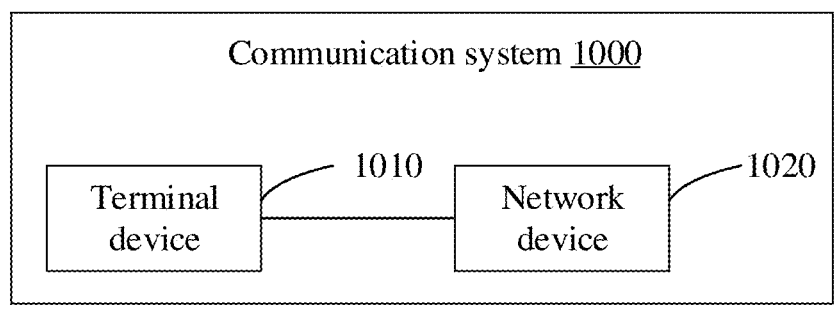
FIG. 10 is a schematic block diagram of a communication system 1000 provided by an embodiment of the present disclosure.

FIG. 10 is a schematic block diagram of a communication system 1000 provided by an embodiment of the present disclosure. As illustrated in FIG. 10, the communication system 1000 includes a terminal device 1010 and a network device 1020.

The terminal device 1010 may be configured to implement corresponding functions implemented by the terminal device in the above method, and the network device 1020 may be configured to implement corresponding functions implemented by the network device or the base station in the above method, which will not be repeated here for the sake of brevity.

It should be understood that the processor may be an integrated circuit chip having signal processing capability.

In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in embodiments of the present disclosure. The general purpose processor can be a microprocessor or any conventional processor. The operations of the method disclosed in the embodiments of the disclosure can be directly embodied as the completion of the execution of the hardware decoding processor or the completion of the combined execution of the hardware and software modules in the decoding processor. The software module may be located in RAM, flash memory, read-only memory, programmable read-only memory or electrically erasable programmable memory, registers and other mature storage media in the art. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory of the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

Optionally, the computer-readable storage medium may applied to the network device or the base station of the embodiment of the present disclosure, and the computer program causes a computer to implement corresponding processes implemented by the network device or the base station in the respective methods of the embodiments of the present disclosure, which will not be repeated here for the sake of brevity.

Optionally, the computer-readable storage medium may applied to the mobile terminal/terminal device of the embodiment of the present disclosure, and the computer program causes a computer to implement corresponding processes implemented by the mobile terminal/terminal device in the respective methods of the embodiments of the present disclosure, which will not be repeated here for the sake of brevity.

In an embodiment of the present disclosure, there is further provided a computer program product, which includes computer program instructions.

Optionally, the computer program product may applied to the network device or the base station of the embodiment of the present disclosure, and the computer program instructions cause a computer to implement corresponding processes implemented by the network device or the base station in the respective methods of the embodiments of the present disclosure, which will not be repeated here for the sake of brevity.

Optionally, the computer program product may applied to the mobile terminal/terminal device of the embodiment of the present disclosure, and the computer program instructions causes a computer to implement corresponding processes implemented by the mobile terminal/terminal device in the respective methods of the embodiments of the present disclosure, which will not be repeated here for the sake of brevity.

In an embodiment of the present disclosure, there is further provided a computer program.

Optionally, the computer program may applied to the network device or the base station of the embodiment of the present disclosure, when run on the computer, the computer program causes a computer to implement corresponding processes implemented by the network device or the base station in the respective methods of the embodiments of the present disclosure, which will not be repeated here for the sake of brevity.

Optionally, the computer program may applied to the mobile terminal/terminal device of the embodiment of the present disclosure, when running on the computer, the computer program causes a computer to implement corresponding processes implemented by the mobile terminal/terminal device in the respective methods of the embodiments of the present disclosure, which will not be repeated here for the sake of brevity.

Those of ordinary skill in the art may realize that the various example units and algorithm steps described in connection with the embodiments disclosed herein can be implemented in electronic hardware or a combination of computer software and electronic hardware. Whether these functions are performed in hardware or software depends on the specific application and design constraints of the technical solution. Professionals can use different methods for each particular application to implement the described functionality but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiment of the apparatus is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other illustrated or discussed may be indirect coupling or communication connection through some interface, device or unit, and may be electrical, mechanical or other form.

The units illustrated as separate elements may or may not be physically separated, and the elements displayed as units may or may not be physical units, i.e. may be located in a place, or may be distributed over a plurality of network units. Part or all of the units can be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in a form of a software functional unit and sold or used as an independent product, they may be stored in a computer readable storage medium. Based on such an understanding, the technical solutions according to the disclosure, in essence or the part contributing to the prior art, or part of the technical solutions can be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art can easily think of changes or substitutions within the technical scope disclosed in the disclosure, which should be covered within the protection scope of the disclosure. Therefore, the scope of protection of the disclosure shall be subject to the scope of protection of the claims.

The invention claimed is:

1. A wireless communication method, comprising:
transmitting, by a terminal device, a first timing advance (TA) value of the terminal device to a network device in response to that the terminal device satisfies a preset condition, wherein the first TA value is obtained based on location information of the terminal device and ephemeris information, and wherein the preset condition comprises that a TA change of the first TA value relative to a last TA value obtained by the terminal device is greater than a preset threshold, wherein the last TA value obtained is determined based on last location information of the terminal device and last ephemeris information, and is reported by the terminal device to the network device after a random access process.

2. The method of claim 1, wherein the preset condition further comprises that
a time domain parameter value indicated by the network device to the terminal device is unavailable, the time domain parameter value being used to determine a transmission time of an uplink channel or uplink transmission information of the terminal device.

3. The method of claim 1, wherein the preset threshold is carried in configuration information.

4. The method of claim 1, wherein the first TA value is an absolute TA value or a relative TA value of the terminal device.

5. A wireless communication method, comprising:
receiving, by a network device, a first timing advance (TA) value of a terminal device,
wherein the first TA value is transmitted in response to that the terminal device satisfies a preset condition, wherein the first TA value is obtained based on location information of the terminal device and ephemeris information, and wherein the preset condition comprises that a TA change of the first TA value relative to a last TA value obtained by the terminal device is greater than a preset threshold, wherein the last TA value obtained is determined based on last location information of the terminal device and last ephemeris information, and is reported by the terminal device to the network device after a random access process.

6. The method of claim 5, wherein the preset condition further comprises that
a time domain parameter value indicated by the network device to the terminal device is unavailable, the time domain parameter value being used to determine a transmission time of an uplink channel or uplink transmission information of the terminal device.

7. The method of claim 5, wherein the preset threshold is carried in configuration information.

8. The method of claim 5, wherein the first TA value is an absolute TA value or a relative TA value of the terminal device.

9. A terminal device, comprising:
a communication unit, configured to transmit a first timing advance (TA) value of the terminal device to a network device in response to that the terminal device satisfies a preset condition, wherein the first TA value is obtained based on location information of the terminal device and ephemeris information, and wherein the preset condition comprises that a TA change of the first TA value relative to a last TA value obtained by the terminal device is greater than a preset threshold, wherein the last TA value obtained is determined based on last location information of the terminal device and last ephemeris information, and is reported by the terminal device to the network device after a random access process.

10. The terminal device of claim 9, wherein the preset condition further comprises that
a time domain parameter value indicated by the network device to the terminal device is unavailable, the time domain parameter value being used to determine a transmission time of an uplink channel or uplink transmission information of the terminal device.

11. The terminal device of claim 9, wherein the preset threshold is carried in configuration information.

12. The terminal device of claim 9, wherein the first TA value is an absolute TA value or a relative TA value of the terminal device.

13. A network device, suitable to perform the wireless communication method of claim 6, the network device comprising:
a transceiver, configured to receive a first timing advance (TA) value of a terminal device,
wherein the first TA value is transmitted in response to that the terminal device satisfies a preset condition, wherein the first TA value is obtained based on location information of the terminal device and ephemeris information, and wherein the preset condition comprises that a TA change of the first TA value relative to a last TA value obtained by the terminal device is greater than a preset threshold, wherein the last TA value obtained is determined based on last location information of the terminal device and last ephemeris information, and is reported by the terminal device to the network device after a random access process.

14. The network device of claim 13, wherein the preset condition further comprises that
a time domain parameter value indicated by the network device to the terminal device is unavailable, the time domain parameter value being used to determine a transmission time of an uplink channel or uplink transmission information of the terminal device.

15. The network device of claim 13, wherein the preset threshold is carried in configuration information.

16. The network device of claim 13, wherein the first TA value is an absolute TA value or a relative TA value of the terminal device.

* * * * *